United States Patent [19]

Kayashima et al.

[11] Patent Number: 5,237,396
[45] Date of Patent: Aug. 17, 1993

[54] SCAN FORMAT CONVERSION APPARATUS

[75] Inventors: Hiroshi Kayashima, Nagaokakyo; Noriyuki Tomimatsu, Nagasaki, both of Japan

[73] Assignee: Mitsubishi Denki Kabushiki Kaisha, Tokyo, Japan

[21] Appl. No.: 840,927

[22] Filed: Feb. 25, 1992

[51] Int. Cl.⁵ .............................. H04N 11/20
[52] U.S. Cl. ........................ 358/11; 358/140
[58] Field of Search .............. 358/140, 11, 230, 166, 358/160

[56] References Cited

U.S. PATENT DOCUMENTS

| | | | |
|---|---|---|---|
| 4,670,772 | 6/1987 | Bolger | 358/140 X |
| 4,719,508 | 1/1988 | Sasaki et al. | 358/140 X |
| 4,819,077 | 4/1989 | Kikuchi et al. | 358/11 X |
| 5,134,479 | 7/1992 | Ohishi | 358/140 |

FOREIGN PATENT DOCUMENTS

| | | |
|---|---|---|
| 61-238182 | 10/1986 | Japan . |
| 62-145975 | 6/1987 | Japan . |
| 63-300681 | 12/1988 | Japan . |

Primary Examiner—Victor R. Kostak
Attorney, Agent, or Firm—Burns, Doane, Swecker & Mathis

[57] ABSTRACT

A scan format conversion apparatus has a scanning conversion circuit which digitally converts an interlaced-scanning TV signal into noninterlaced-scanning RGB signals and synchronizing signals. A plurality of interpolation computing circuits respectively produce a plurality of interpolation signals from the signals outputted from the scanning conversion circuit by executing computing operations. A plurality of image memories respectively store the signals outputted from the interpolation computing circuits for one-frame period. A memory controller properly controls the writing and reading operation performed by the plural image memories. The apparatus generates a plurality of scan-line data by a certain amount more than those which are generated by the noninterlaced-scanning operation, and then selects scan-line data available for a display unit with uniform alignment from the increased scan-line data.

7 Claims, 2 Drawing Sheets

SCAN FORMAT CONVERSION APPARATUS

BACKGROUND OF THE INVENTION

1. Field of the Invention

This invention relates to a scan format conversion apparatus for reproducing television signal digitally on a television such as a large display unit or a plane display unit.

2. Description of Related Art

FIG. 1 schematically presents a simplified block diagram of a conventional scan format conversion apparatus which is made available for displaying an NTSC-format television signal (hereinafter merely called NTSC signal) on those plane display units using different scan formats. The reference numeral 1 shown in FIG. 1 designates an input terminal for receiving an NTSC signal. The reference numeral 2 designates an IDTV decoder consisting of a circuit which separates the luminance signal and the chrominance signal from the NTSC signal, demodulates the chrominance signal, and then converts the interlaced-scanning signal into a noninterlaced-scanning signal. The IDTV decoder 2 outputs a noninterlaced-scanning synchronizing signal to a clock/control pulse generating circuit 3, and also outputs noninterlaced-scanning Red(R.) Green(G.) and Blue(B.) signals to respective A/D converters 4, 5 and 6. Synchronous with the inputted synchronizing signal, the clock/control pulse generating circuit 3 generates clock and control pulses for delivery to the A/D converters 4, 5, 6, and to a memory controller 7.

The A/D converters 4, 5, 6 convert the inputted analog signals into respective digital R.G.B. signals, and then output the digitized R.G.B. signals to corresponding image memories 8, 9, 10. These image memories 8 through 10 write and store digitized signals outputted from respective A/D converters 4, 5, 6 every frame period, and then respectively output needed data signals to an R-signal output terminal 11, a G-signal output terminal 12, and a B-signal output terminal 13. In order to properly control data writing and reading operations of the image memories 8, 9, 10, the memory controller 7 outputs control signals to those image memories 8, 9, 10.

Next, the functional operation of the conventional scan format conversion apparatus cited above will be described.

Initially, an analog NTSC TV signal is delivered to the IDTV decoder 2 via the input terminal 1. Next, the IDTV decoder 2 sequentially converts the analog NTSC signal scanning lines into separate luminance and chrominance signals. The IDTV decode 2 then outputs the noninterlaced-scanning RGB signals representing 525 scan lines per frame at a frame frequency of 59.94 Hz. The IDTV decode 2 also outputs a corresponding synchronizing signal. Next, the clock/control pulse generating circuit 3 outputs clock and control pulses synchronized with the inputted synchronizing signal, to the A/D converters 4, 5, 6 and the memory controller 7.

An apparatus (hereinafter called a display unit) capable of displaying signals that are outputted from the R-signal output terminal 11, the G-signal output terminal 12, and the B-signal output terminal 13 must fully satisfy the aspect ratio prescribed for the NTSC signal. Therefore, the display unit has 4n×3n pixels (where n designates a positive integer). Since the NTSC signal contains 83% of the effective horizontal scanning rate, and assuming that the horizontal scanning frequency of the RGB signal sequentially converted by the IDTV decoder 2 is "fH", then, the value of the clock pulse "fs" re-sampled by the A/D converters 4, 5, 6 can be computed by applying the equation (1) shown below.

$$fs = 4n \times (100/83) \times fH \quad (1)$$

The analog R-signal, G-signal, and B-signal outputted from the IDTV decoder 2 are respectively converted into digital signals by the respective A/D converters 4, 5, 6 at the rate "fs" computed from equation (1). These digitized signals outputted from those A/D converters 4, 5, 6 are respectively written in the corresponding image memories 8, 9, 10 every frame period. The memory controller 7 properly controls the operation for writing these digitized signals into those image memories 8, 9, 10.

The NTSC signal contains 490 effective scanning lines per frame. On the other hand, each display unit incorporates 3n number of pixels in the vertical direction. Consequently, the effective scanning lines should be converted from 490 scanning lines into 3n scanning lines. Conversion of the scanning lines is executed by reading data from those image memories 8, 9, 10. The relationship between the data DM(i) of those data written in the image memories 8, 9, 10 every frame period, corresponding to the i-th scanning lines (where i=1, 2, ..., 490), and the data DO(k) corresponding to the k-th scanning line of the display unit (where k=1, 2, ..., 3n) is ruled by the equation (2) shown below, where a linear conversion of the scanning line is executed.

$$DO(k) = DM(1 + INT[489 \times (k-1)/(3n-1)]) \quad (2)$$

where INT bracket [ ] designates the maximum integer that does not exceed the number shown in the above bracket [ ].

According to the above equation (2), the memory controller 7 properly controls the operation for reading data from the image memories 8, 9, 10. As a result, the scan-line converted RGB signals are delivered to the R-signal output terminal 11, the G-signal output terminal 12, and the B-signal output terminal 13 of the corresponding image memories 8, 9, 10.

Next, examples of the scan-line conversion based on the above equation (2) are respectively shown below by referring to the case in which (a)n=50 and (b)n=400. The case in which (a)n=50

Since the display unit contains 3n=150 of pixels in the vertical direction, the data DO(1) through DO(150) corresponding to the scanning lines of the display unit are computed in accordance with the above equation (2).

DO(1) = DM(1 + INT[0] = DM(1)
DO(2) = DM(1 + INT[489/149]) = DM(4)
DO(3) = DM(1 + INT[489 × 2/149]) = DM(7)

.

DO(148) = DM(1 + INT[489 × 147/149]) = DM(483)
DO(149) = DM(1 + INT[489 × 148/149]) = DM(486)
DO(150) = DM(1 + INT[489]) + DM(490)

The data DO(1) through DO(150) are respectively read by reading those data corresponding to the 490 scanning lines written in the image memories 8, 9, 10 at intervals of 3 or 4 scanning lines apart. The case in which (b)n=400

Since the display unit contains 3n=1200 pixels in the vertical direction, the data DO(1) through DO(1200) corresponding to the scanning lines of the display unit are computed in accordance with the above equation (2).

DO(1) = DM(1 + INT[0]) = DM(1)
DO(2) = DM(1 + INT[489/1199]) = DM(1)
DO(3) = DM(1 + INT[489 × 2/1199]) = DM(1)
.
.
.
DO(1198) = DM(1 + INT[489 × 1197/1199]) = DM(489)
DO(1199) = DM(1 + INT[489 × 1198/1199]) = DM(489)
DO(1200) = DM(1 + INT[489]) = DM(490)

The data DO(1) through DO(1200) are respectively read by reading the data corresponding to 490 scanning lines written in the image memories 8, 9, 10. It can be seen that, in this case, each of the 490 scan lines located in the image memories 8, 9, 10 is repeatedly used for several display unit scan lines.

Actually, any conventional scan format conversion apparatus incorporates the operating system described above. Consequently, the number of pixels in the vertical direction (i.e., the the number of scanning line) of all the signals delivered to the image memories 8, 9, 10 remains constant. When reproducing an image on a display unit that has more vertical pixels than the number of vertical pixels contained in the image signal, any of the conventional scan format conversion apparatuses needs to read the identical pixels from those image memories 8, 9, 10 twice. On the other hand, when reproducing an image on a display unit that has fewer vertical pixels the number of vertical pixels contained in the image signal, the conventional apparatus needs to read pixels at intervals of several pixels. Consequently a resulting problem is that oblique lines of an image cannot continuously be displayed.

SUMMARY OF THE INVENTION

A primary object of the invention is to provide a novel scan-format conversion apparatus which is capable of continuously and correctly displaying oblique lines independent of the relative increase or decrease in the number of pixels aligned in the vertical direction in a display unit compared to the number of scanning lines in an image signal. This is attained by the provision of interpolation scan-line signals for all of the input signals in correspondence with the number of pixels, or scanning lines, aligned in the vertical direction in the display unit.

Characteristically, the scan format conversion apparatus embodied by the invention has the following: a scanning conversion circuit which digitally converts an interlaced-scanning TV signal into noninterlaced-scanning RGB signals and synchronizing signals; an interpolation computing circuit which generates a plurality of interpolation signals by executing computing operations on the basis of the signals outputted from the scanning conversion circuit; an image memory which stores those signals outputted from the interpolation computing circuit every frame period; and a controller which properly controls data writing and reading operation of the image memory. The scan format conversion apparatus embodied by the invention generates interpolation signals so that the number of scanning lines can exactly correspond to the least common multiple between 525 of the scanning lines of the NTSC signal and the number of scanning lines of the display unit, and then selects signals available for the display unit from the increased interpolation signals by way of uniformly aligning them.

The above and further objects and features of the invention will more fully be apparent from the following detailed description with accompanying drawings.

DESCRIPTION OF THE PREFERRED EMBODIMENTS

Referring now to the accompanying drawings, a detailed description of an embodiment of the scan format conversion apparatus according to the present invention is now presented.

Figure 1:
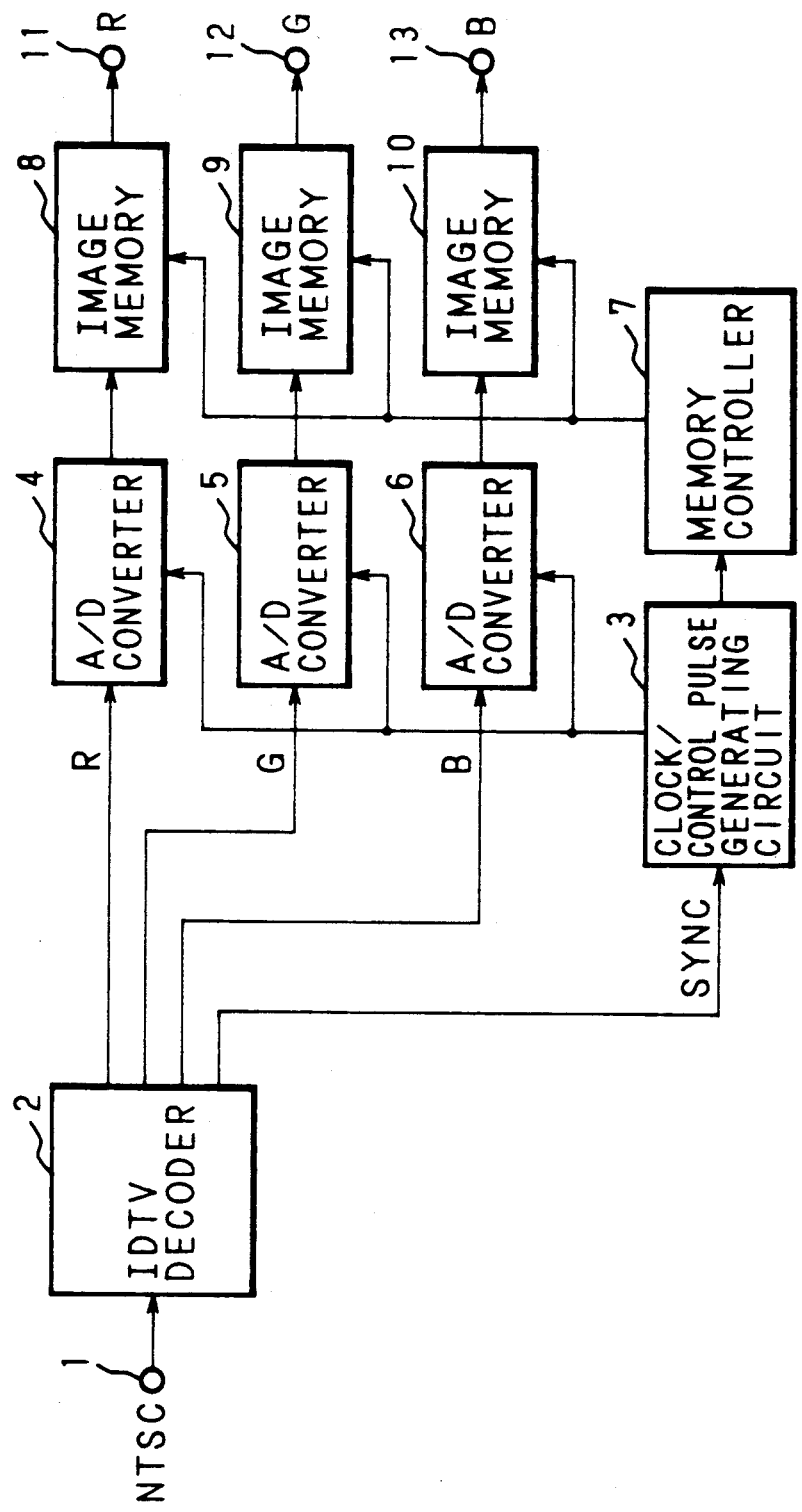
FIG. 1 schematically designates a simplified block diagram of a conventional scan format conversion apparatus.
Figure 2:
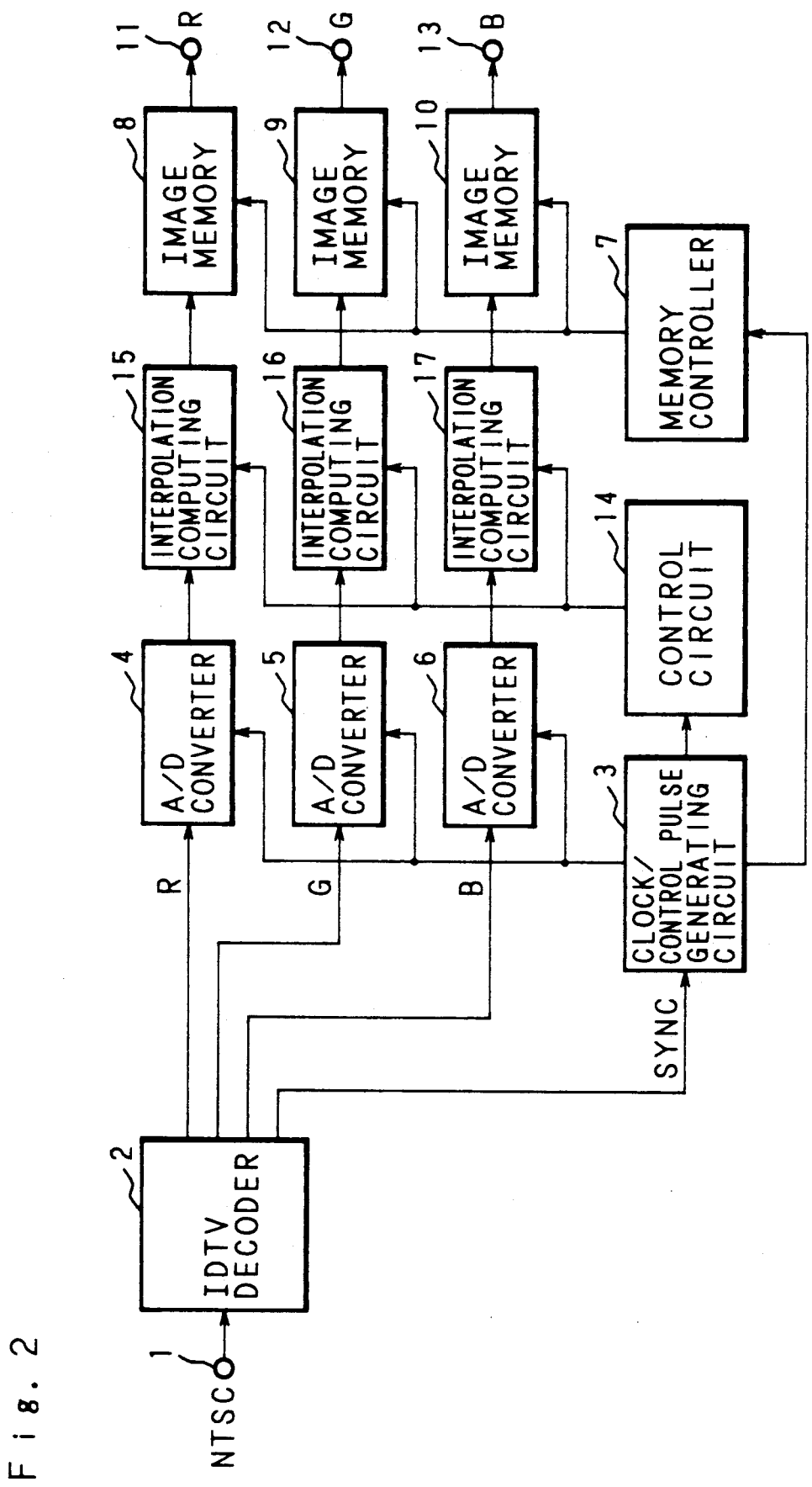
FIG. 2 schematically designates the concrete block diagram of the scan format conversion apparatus according to an embodiment of the invention.

FIG. 2 is a block diagram of the scan format conversion apparatus embodied by the invention, which is capable of displaying an NTSC signal on a plane display unit that utilizes a different scan format. The reference numeral 1 shown in FIG. 2 designates an input terminal for receiving an NTSC signal. The reference numeral 2 designates an IDTV decoder. The input terminal 1 and the IDTV decoder 2 shown in FIG. 2 are respectively identical to those which are available for any conventional scan format conversion apparatus. The IDTV decoder 2 outputs a noninterlaced-scanning synchronizing signal to a clock/control pulse generating circuit 3 and also outputs noninterlaced-scanning RGB signals to corresponding A/D converters 4, 5, 6. Synchronous with the received noninterlaced-scanning synchronizing signal, the clock/control pulse generating circuit 3 generates clock and control pulses, and then outputs the clock and control pulses to the corresponding A/D converters 4, 5, 6, a control circuit 14, and a memory controller 7. These A/D converters 4, 5, 6 and the memory controller 7 are respectively identical to those which are conventionally made available.

The A/D converters 4, 5, 6, 7 respectively convert the input signals into digital signals, and then output those digitized RGB signals to corresponding interpolation computing circuits 15, 16, 17. On the basis of the input data, the interpolation computing circuits 15, 16, 17 respectively produce interpolation scan-line data by executing computing operations described below, and then output the original scan-line data and the produced interpolation scan-line data to the corresponding image memories 8 through 10. These image memories 8, 9, 10 respectively write data outputted from those interpolation computing circuits 15, 16, 17 every frame period, and then output only the needed data to an R-signal output terminal 11, a G-signal output terminal 12, and a B-signal output terminal 13. The control circuit 14 outputs control signals to the interpolation computing circuits 15, 16, 17 in order to properly control computing operations executed by these circuits. The memory controller 7 outputs control signals to the image memories 8, 9, 10 in order to properly control data writing and reading operations executed by these image memories.

Next, the functional operation of the scan format conversion apparatus embodied by the invention is described below.

Initially, an analog NTSC signal is transmitted to the IDTV decoder 2 via the input terminal 1. Next, in order to separate the NTSC signal into a luminance signal and a chrominance signal, the IDTV decoder 2 sequentially converts scanning lines, and then outputs the noninterlaced-scanning RGB signals containing 59.94 Hz of frame frequency and 525 scan lines in conjunction with a synchronizing signal. Next, the clock/control pulse generating circuit 3 outputs the clock and control pulses synchronous with the inputted synchronizing signal to the A/D converters 4, 5, 6, the control circuit 14, and the memory controller 7. Like the conventional practice, based on the value of clock "fs" ruled by the equation (1) shown earlier, the A/D converter 4 digitizes the R-signal outputted from the IDTV decoder 2. Likewise, the A/D converter 5 digitizes the G-signal outputted from the IDTV decoder 2. The A/D counter 6 also digitizes the B-signal outputted from the IDTV decoder 2. These digitized RGB signals are sequentially delivered to the corresponding interpolation computing circuits 15, 16, 17.

The interpolation computing circuits 15, 16, 17 respectively execute computing operations by applying the i-th scan-line data (which is assumed to be $DI(i)$) actually being inputted and another data (which is assumed to be $DI(i-1)$) in the last scanning line, and then produce new data $x(1), x(2), \ldots, x(m)$ available for m-number of scanning lines (where m is a positive integer).

The interpolation process is described below.

$$x(1) = DI(i-1) \times m/(m+1) + DI(i)/(m+1)$$
$$x(2) = DI(i-1) \times (m-1)/(m+1) + DI(i) \times 2/(m+1)$$
$$\vdots$$
$$x(m) = DI(i-1)/(m+1) + DI(i) \times m/(m+1)$$

The data $x(1)$ through $x(m)$ generated by the interpolation computing circuits 15, 16, 17 respectively correspond to those which contain m-number of scanning lines containing phases being apart from each other at equal intervals in the vertical direction. These data are quite ideal for the interpolation scanning lines. Execution of the interpolating computing operation is properly controlled by the control signal outputted from the control circuit 14. In the course of each frame period, those data corresponding to 490 of effective scanning lines are respectively delivered to these interpolation computing circuits 15, 16, 17. In consequence, the interpolation computing circuits 15, 16, 17 respectively produce those output data corresponding to (490+489 m) scan lines.

These produced data are respectively written in the corresponding image memories 8, 9, 10. The operation for writing these data in image memories 8, 9, 10 is controlled by the memory controller 7. As described earlier, since there are 3n pixels in the vertical direction of the display unit, it is essential that the number of scanning lines should be converted from (490+ 489 m) to 3n. Conversion of scanning line is executed by reading data from the image memories 8, 9, 10. More particularly, the number of scanning lines is linearly converted into 3n by ruling the relationship between the data $D'M(t)$ of those data written in those image memories 8, 9, 10 in a frame period, corresponding to the t-th scanning line (where t = 1, 2, ..., 490+489 m), and the data $DO(k)$ corresponding to the k-th scanning line (where k = 1, 2, ..., 3 n) based on the equation (3) shown below.

$$DO(k) = D'M(-1 + INT[489 + 489m) \times (k-1)/(3n-1)]). \quad (3)$$

where INT[ ] designates the maximum integer that does not exceed the scope of bracket [].

Based on the above equation (3), the memory controller 7 properly controls the operation for reading data from the image memories 8, 9, 10. In consequence, scan-line converted RGB signals are respectively delivered to the corresponding R-signal output terminal 11, the G-signal output terminal 12, and the B-signal output terminal 13.

Based on the assumption that (A)m=3 and n=50 and (B)m=3 and n=400, examples of the scan-line conversion in accordance with the above equation (3) are shown below. The case (A) in which m=3 and n=50

Since the display unit contains 3n=150 of pixels in the vertical direction, the data DO (1) through DO(150) corresponding to the scanning lines of the display unit are respectively computed in accordance with the above equation (3).

$$DO(1) = D'M(1 + INT[0]) = D'M(1) = DM(1)$$
$$DO(2) = D'M(1 + INT[(489 + 489 \times 3)/149]) = D'M(14)$$
$$= \tfrac{1}{2}DM(4) + \tfrac{1}{2}DM(5)$$
$$DO(3) = D'M(1 + INT[(489 + 489 \times 3) \times 2/149]) = D'M(27)$$
$$= \tfrac{1}{2}DM(7) + \tfrac{1}{2}DM(8)$$

$$\vdots$$

$$DO(148) = D'M(1 + INT[(489 + 489 \times 3) \times 147/149])$$
$$= D'M(1930) = \tfrac{1}{2}DM(483) + \tfrac{1}{2}DM(484)$$
$$DO(149) = D'M(1 + INT[(489 + 489 \times 3) \times 148/149])$$
$$= D'M(1943) = \tfrac{1}{2}DM(486) + \tfrac{1}{2}DM(487)$$
$$DO(150) = D'M(1 + INT[489 + 489 \times 3]) = D'M(1957)$$
$$= DM(490)$$

Substantially, the data DO(1) through DO(150) are respectively read by reading the data corresponding to 1957 scanning lines written in those image memories 8, 9, 10 at intervals of 13 or 14 scanning lines. The case (B) in which m=3 and n=400

Since the display unit contains 3n=1200 pixels in the vertical direction, the data DO(1) through DO(1200) corresponding to the scanning lines of the display unit are respectively computed in accordance with the above equation (3).

$$DO(1) = D'M(1 + INT[0]) = D'M(1) = DM(1)$$
$$DO(2) = D'M(1 + INT[(489 + 489 \times 3)/1199]) = D'M(2)$$
$$= \tfrac{1}{2}DM(1) + \tfrac{1}{2}DM(2)$$
$$DO(3) = D'M(1 + INT[(489 + 489 \times 3) \times 2/1199]) = D'M(4)$$
$$= \tfrac{1}{2}DM(1) + \tfrac{1}{2}DM(2)$$

$$\vdots$$

$$DO(1198) = D'M(1 + INT[(489 + 489 \times 3) \times 1197/1199])$$
$$= D'M(1953) = DM(489)$$
$$DO(1199) = D'M(1 + INT[(489 + 489 \times 3) \times 1198/1199])$$
$$= D'M(1955) = \tfrac{1}{2}DM(489) + \tfrac{1}{2}DM(490)$$
$$DO(1200) = D'M(1 + INT[489 + 489 \times 3]) = D'M(1957)$$
$$= DM(490)$$

Substantially, the data DO(1) through DO(1200) are respectively read by reading the data corresponding to 1957 scanning lines written in those image memories 8, 9, 10 on a continuous basis or at intervals of every other scanning line.

As is clear from the above description, the scan format conversion apparatus embodied by the invention produces the data corresponding to 489 interpolation scanning lines having correct phases in addition to the 490 input pixels. Consequently oblique lines of image can continuously be displayed, independent of the increase or decrease in the number of pixels aligned in the vertical direction of the display unit.

The above embodiment of the invention permits those image memories 8, 9, 10 to internally write those data corresponding to (490+489 m) scanning lines produced by execution of interpolation computing operations, and then read the data corresponding to 3 n of scanning lines the display unit from the image memories 8, 9, 10. On the other hand, the embodiment of the invention may initially select data corresponding to 3 n scanning lines of the display unit from those data corresponding to (490+498 m) scanning lines, write selected data in the image memories 8, 9, 10, and then read the selected data therefrom.

The above description of the embodiment of the invention has solely referred to the case of the NTSC signal. However, even when displaying image signals conforming to PAL, SECAM and HDTV formats, and image signals produced by computer the scan format conversion apparatus embodied by the invention can securely execute those scan format conversion processes in the same way.

Furthermore, the above embodiment has controlled execution of linear conversion of scanning lines as shown in the above equation (3). Nevertheless, even when applying any computing format other than the one shown by the above equation (3), scanning lines can also properly be converted insofar as linear conversion is executed.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A scan format conversion apparatus which converts a scanning line format when displaying an image represented by an analog interlaced-scanning signal on a noninterlaced-scanning format display unit, comprising:

converting means for converting said analog interlaced-scanning signal into a noninterlaced-scanning signal and generating a synchronizing signal and a noninterlaced-scanning analog image signal;

signal generating means for generating a timing signal on the basis of said synchronizing signal generated by said converting means;

A/D conversion means for digitizing the noninterlaced-scanning analog image signal generated by said converting means to produce a digital noninterlaced-scanning image signal;

interpolation computing means for computing a plurality of interpolation signals on the basis of said digital noninterlaced-scanning image signal produced by said A/D conversion means;

memory means for storing the interpolation signals computed by said interpolation computing means for a predetermined time; and control means for controlling the writing and reading operation of said memory means.

2. A scan format conversion apparatus as set forth in claim 1, wherein said interlaced-scanning signal is a television signal.

3. A scan format conversion apparatus as set forth in claim 2, wherein said A/D conversion means samples the television signal in synchronization with the timing signal generated by said signal generating means and then generates the digital noninterlaced-scanning image signal.

4. A scan format conversion apparatus as set forth in claim 1, wherein said memory means stores the interpolation signals outputted from said interpolation computing means for one frame period.

5. A scan format conversion apparatus as set forth in claim 1, wherein said control means controls the writing and reading operation of said memory means on the basis of the timing signal generated by said signal generating means.

6. A scan format conversion apparatus as set forth in claim 1, further comprising computing operation control means for controlling the timing of computing operation executed by said interpolation computing means.

7. A scan format conversion apparatus as set forth in claim 6, wherein said computing operation control means controls the computing operation of said interpolation computing means on the basis of the timing signal generated by said signal generating means.

* * * * *

UNITED STATES PATENT AND TRADEMARK OFFICE
CERTIFICATE OF CORRECTION

PATENT NO. : 5,237,396
DATED : August 17, 1993
INVENTOR(S) : Hiroshi Kayashima et al It is certified that error appears in the above-indentified patent and that said Letters Patent is hereby corrected as shown below:

On title page, item [75] delete "Hiroshi Kayashima, Nagaokakyo; Noriyuki Tomimatsu, Nagasaki, both of Japan" and insert
--Hiroshi Kayashima; Takatomo Watanabe, both of Nagaokakyo; Noriyuki Tomimatsu, Nagasaki, all of Japan--

Signed and Sealed this

Third Day of May, 1994

Attest:

BRUCE LEHMAN

*Attesting Officer*  *Commissioner of Patents and Trademarks*